United States Patent
Morizane et al.

(10) Patent No.: US 8,033,272 B2
(45) Date of Patent: Oct. 11, 2011

(54) METHOD OF DIAGNOSING ELECTRICALLY DRIVEN SUPERCHARGER

(75) Inventors: Kenichi Morizane, Hiroshima (JP); Hideya Horii, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 642 days.

(21) Appl. No.: 11/836,346

(22) Filed: Aug. 9, 2007

(65) Prior Publication Data

US 2008/0047525 A1 Feb. 28, 2008

(30) Foreign Application Priority Data

Aug. 28, 2006 (JP) ................................. 2006-230083

(51) Int. Cl.
*F02B 33/00* (2006.01)
(52) U.S. Cl. ...................................................... 123/565
(58) Field of Classification Search .............. 60/607, 60/608; 123/559.1–559.3, 560–565; 180/65.26
See application file for complete search history.

(56) References Cited

U.S. PATENT DOCUMENTS

| 6,637,205 | B1 * | 10/2003 | Ahmad et al. | 60/608 |
| 6,688,104 | B2 * | 2/2004 | Baeuerle et al. | 60/608 |
| 7,040,304 | B2 * | 5/2006 | Kassner | 123/565 |
| 7,210,296 | B2 * | 5/2007 | Bolz et al | 60/608 |
| 7,357,109 | B2 * | 4/2008 | Mitsuhori et al. | 123/179.5 |

FOREIGN PATENT DOCUMENTS

| EP | 1279815 | 1/2003 |
| EP | 1342995 B1 | 3/2006 |
| FR | 2843778 | 2/2004 |
| FR | 2851610 | 8/2004 |
| JP | 2001-123844 A | 5/2001 |
| JP | 2004-108152 A | 4/2004 |
| JP | 2006-070781 A | 3/2006 |
| JP | 2006-220124 A | 8/2006 |

* cited by examiner

*Primary Examiner* — Thomas Denion
*Assistant Examiner* — Cameron Setayesh
(74) *Attorney, Agent, or Firm* — Alleman Hall McCoy Russell & Tuttle LLP

(57) ABSTRACT

There is provided a method of controlling an engine system having an internal combustion engine, a supercharger arranged in an intake air passage of said internal combustion engine and a motor capable of driving the supercharger. The method comprises, driving the motor to operate the supercharger to boost airflow inducted into the internal combustion engine when the internal combustion engine is in operation. The method further comprises driving the motor to determine a state of the supercharger when the internal combustion engine is stopped and indicating the determined state of the supercharger. According to the method, by driving the motor of the supercharger to detect a state of the supercharger when the internal combustion engine is stopped, the state of the supercharger can be more accurately detected because the condition is most stable.

19 Claims, 8 Drawing Sheets

METHOD OF DIAGNOSING ELECTRICALLY DRIVEN SUPERCHARGER

BACKGROUND

The present description generally relates to a supercharger for an internal combustion engine, and more particularly relates to a method of diagnosing a supercharger which is driven by a motor such as an electric motor.

Conventionally, a mechanical supercharger and a turbocharger are known to boost intake air to the engine. The mechanical supercharger is driven by the engine crankshaft. The turbocharger is driven by the engine exhaust gas. Therefore, the engine speed and how it is related to engine flow influence supercharging efficiencies. In particular, those superchargers may boost less air in the lower engine speed range where engine flow may be limited.

To improve the supercharging efficiencies in the lower speed range, there is known and presented, for example in European Patent EP1342895B1, an electrically driven compressor. The electric compressor is arranged in the engine intake system upstream of the turbocharger compressor and boosts the intake air in addition to the turbocharger.

The '895 patent also shows a method of diagnosing the electric compressor operation by comparing boosting power output from and electric power input to the electric compressor. These parameters are derived using an engine system model. As a result, the method of the '895 patent can diagnose a degradation of the supercharger operation during engine operation. However, conditions affecting the parameters may fluctuate during the engine operation, thereby reducing the diagnostic confidence level. For example, there is a fluctuation of the intake air pressure as the engine is cyclically inducting the air. In some cases, it is possible for the intake air pressure fluctuation to overcome a change of the pressure of the air boosted by the electric compressor.

Therefore, there is room to improve the accuracy of the diagnosing the supercharger operation.

SUMMARY

Accordingly, there is provided, in one aspect of the present description, a method of controlling an engine system having an internal combustion engine, a supercharger arranged in an intake air passage of said internal combustion engine and a motor capable of driving the supercharger. The method comprises, driving the motor to operate the supercharger to boost airflow inducted into the internal combustion engine when the internal combustion engine is in operation. The method further comprises driving the motor to determine a state of the supercharger when the internal combustion engine is stopped and indicating the determined state of the supercharger.

According to the method, by driving the motor of the supercharger to detect a state of the supercharger when the internal combustion engine is stopped, the state of the supercharger can be more accurately detected because the condition is most stable. More specifically, air initially does not flow in the engine intake system since the engine is stopped. Therefore, even a lower level of supercharger operation may cause a change in the airflow. As a result, by detecting the amount of airflow, the state of the supercharger can be more accurately determined. Further, less energy is needed to drive the motor to cause the smaller amount of the supercharger operation. Consequently, the state of the supercharger can be more accurately determined while consuming less energy.

BRIEF DESCRIPTION OF THE DRAWINGS

The advantages described herein will be more fully understood by reading examples of embodiments in which the above aspects are used to advantage, referred to herein as the Detailed Description, with reference to the drawings wherein.

DETAILED DESCRIPTION

Figure 1:
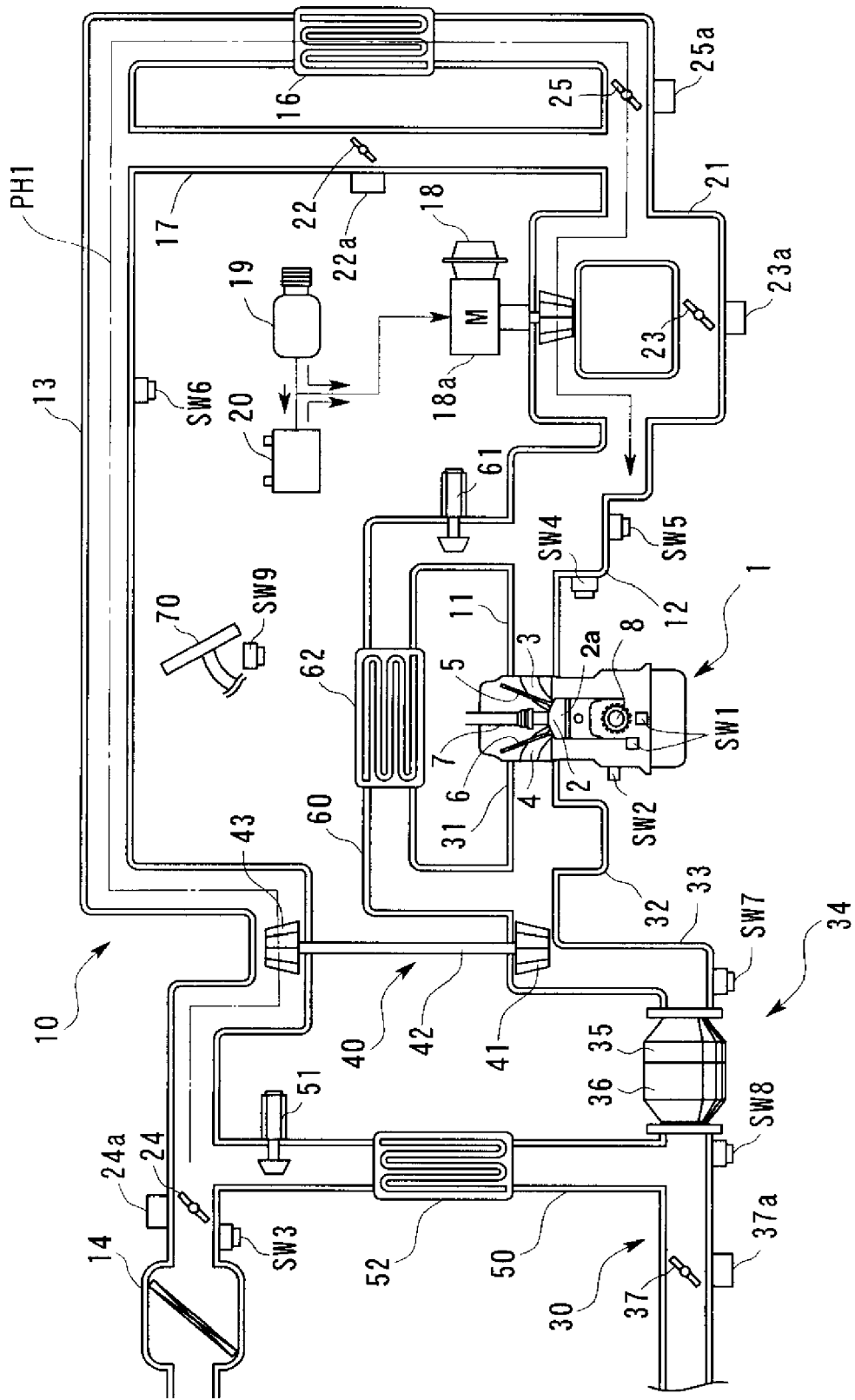
FIG. 1 shows a schematic view of a supercharged engine system according to an embodiment of the present description.

An embodiment of the present description will now be described with reference to the drawings. Referring to FIG. 1, there is shown an engine system in accordance with one embodiment of the present description. The engine system is mounted on a land vehicle such as an automotive vehicle to propel the vehicle by transmitting output torque of the engine system through a transmission mechanism to driving wheel as is well known in the art.

The engine system includes an internal combustion engine 1, which is not limited to but a diesel engine in this embodiment. The engine 1 has a plurality of cylinders 2 although only one is shown. A combustion chamber 2a is defined by each of the cylinders 2, a cylinder head and a piston as is well known in the art. An intake port 3 and an exhaust port 4 are arranged on the cylinder head and open to the combustion chamber 2a. An intake valve 5 and an exhaust valve 6 are arranged in the intake and exhaust ports 3 and 4 respectively as is well known in the art. A fuel injector 7 is arranged on the cylinder head and faces to the combustion chamber 2a.

An intake system 10 is coupled to the intake port 3 to supply fresh air to the cylinder 2. An exhaust system 30 is coupled to the exhaust port 4 to expel the exhaust gas from the cylinder 2.

The intake system 10 comprises an intake manifold 12 having discrete intake passages 11 that are coupled to the respective intake ports 3 of the cylinders 2, and a common intake passage 13. The discrete intake passages 11, the intake manifold 12 and the common intake passage 13 consist of a main intake path PH1 as shown by a dotted line in FIG. 1.

An air cleaner 14 is arranged upstream of the common intake passage 13. An intercooler 16 is arranged in the common intake passage 13 between the air cleaner 14 and the intake manifold 12. A cooler bypass passage 17 is arranged to bypass the intercooler 16.

An electric supercharger 18 is arranged in the common intake passage 13 downstream of the cooler bypass passage 17. The electric supercharger 18 may comprise an impeller driven by an electric motor 18a. The electric supercharger motor 18a is configured capable of operating with electricity supplied from an electric power supply system including an alternator 19 and a battery 20. The alternator 19 is driven by the engine output shaft to generate electricity which may be charged to the battery 20.

Still referring to FIG. 1, there is shown an electric supercharger bypass passage 21 which bypasses the electric supercharger 18 and communicates from the cooler bypass passage 17 to the upstream end of the intake manifold 12. To change the flow path of the air in the intake system 10, bypass control valves 22 and 23 are respectively arranged in the cooler bypass passage 17 and the electric supercharger bypass passage 21. The bypass control valves 22 and 23 are actuated by actuators 22a and 23a which may comprise an electromagnetic solenoid. The actuators 22a and 23a are controlled by an engine controller 100 which will be described in greater detail. Alternatively, the actuator, especially the actuator 23a arranged in the electric supercharger bypass passage 21, may comprise a diaphragm actuated by the intake air vacuum. It may be configured to automatically actuate the bypass control valve 23 to close the electric supercharger bypass passage 21 when the intake air pressure is lower than a predetermined pressure.

On the other hand, the exhaust system 30 comprises an exhaust manifold 32 having discrete exhaust passages 31 that are coupled to the exhaust ports 4 of the respective cylinders 2, a common exhaust pipe 33, and an exhaust purification system 34 that is coupled to the downstream end of the common exhaust pipe 33. The exhaust purification system 34 comprises an oxidation catalyst 35 and a particulate filter 36 that is arranged downstream of the oxidation catalyst 35.

A turbocharger 40 is arranged both in the intake system 10 and the exhaust system 30. Specifically, the turbocharger 40 comprises a turbine wheel 41, a shaft 42 and a compressor wheel 43 connected to the turbine wheel 41 through the shaft 42. The rotation of the compressor wheel 43 corresponding to the rotation of the turbine wheel 41 causes boost of the intake air. The turbine wheel 41 of the turbocharger 40 is arranged in the common exhaust pipe 33. The compressor wheel 43 is arranged in the upstream part of the common intake passage 13. The intercooler 16 is configured to cool the air boosted by the compressor wheel 43.

Still referring to FIG. 1, arranged between the intake system 10 and the exhaust passage 30 are a low pressure EGR (exhaust gas recirculation) passage 50 and a high pressure EGR passage 60.

The low pressure EGR passage 50 connects a portion of the common exhaust pipe 33 downstream of the exhaust purification system 34 and a portion of the common intake passage 13 upstream of the compressor wheel 43 and re-circulates a portion of the exhaust gas which has driven the turbine wheel 41 of the turbocharger 40 and has a lower pressure and a lower temperature.

The high pressure EGR passage 60 connects a portion of the common exhaust pipe 33 upstream of the turbine wheel 41 and the intake manifold 12 and re-circulates a portion of the exhaust gas which is higher in temperature and pressure and will drive the turbocharger 40 afterward.

EGR control valves 51 and 61 are provided respectively in the low pressure EGR passage 50 and the high pressure EGR passage 60. The engine controller 100 controls the operations of the valves 51 and 61. EGR coolers 52 and 62 are arranged upstream of the EGR control valves 51 and 61 respectively or at the exhaust side of the valves.

A low pressure intake throttle valve 24 is arranged in the intake system 10 upstream of the low pressure EGR passage 50 to adjust intake airflow amount and can be actuated by a stepping motor 24a. On the other hand, an intake shutter valve 25 is arranged between the intercooler 16 and the cooler bypass passage 17 to shut when the engine stops and can be operated by a stepping motor 25a. The engine controller 100 controls the stepping motors 24a and 25a to adjust the openings of the throttle valve 24 and the intake shutter valve 25.

In the exhaust system 30, an exhaust shutter valve 37 is arranged in the common exhaust pipe 33 downstream of the low pressure EGR passage 33 and can be actuated by an actuator 37a.

A crank angle sensor SW1, an engine temperature sensor SW2 and other sensors are provided to detect operating conditions of the engine. The crank sensor SW1 consists of two sensors. They are configured to calculate an engine speed $N_{ENG}$ based on a pulse signal detected from one of the sensors and calculate a direction of rotation and a phase of the crankshaft 8 based on detected signals output from the both and offset from each other in phase. The engine temperature sensor SW2 detects a temperature of engine coolant which circulates in the engine 1 as is well known in the art.

Still referring to FIG. 1, in the intake system 10, to detect airflow amount just after passing the air cleaner 14, an airflow meter SW3 is provided in the common intake passage 13 between the air cleaner 14 and the intake throttle valve 24. In the intake manifold 12, an intake temperature sensor SW4 is provided to detect an intake air temperature, and an intake pressure sensor SW5 is provided to detect an intake pressure, just upstream of the engine 1. Further upstream of the cooler bypass passage 17 in the common intake passage 13, a boost pressure sensor SW6 is provided to detect a pressure downstream of and boosted by the turbocharger 40.

On the other hand, in the exhaust system 30, an exhaust gas oxygen sensor SW7 is arranged upstream of the exhaust purification system 34 to detect oxygen concentration of the exhaust gas for adjustment of fuel injection amount by the injector 7. Downstream of the exhaust purification system 34, a downstream exhaust gas oxygen sensor SW8 is provided to detect oxygen concentration of the exhaust gas for determining activity level of the exhaust purification system 34.

Further in the engine system, an accelerator sensor SW9 is provided to detect a position of the accelerator pedal 70 for determining a torque demand by a vehicle operator or driver.

Figure 2:
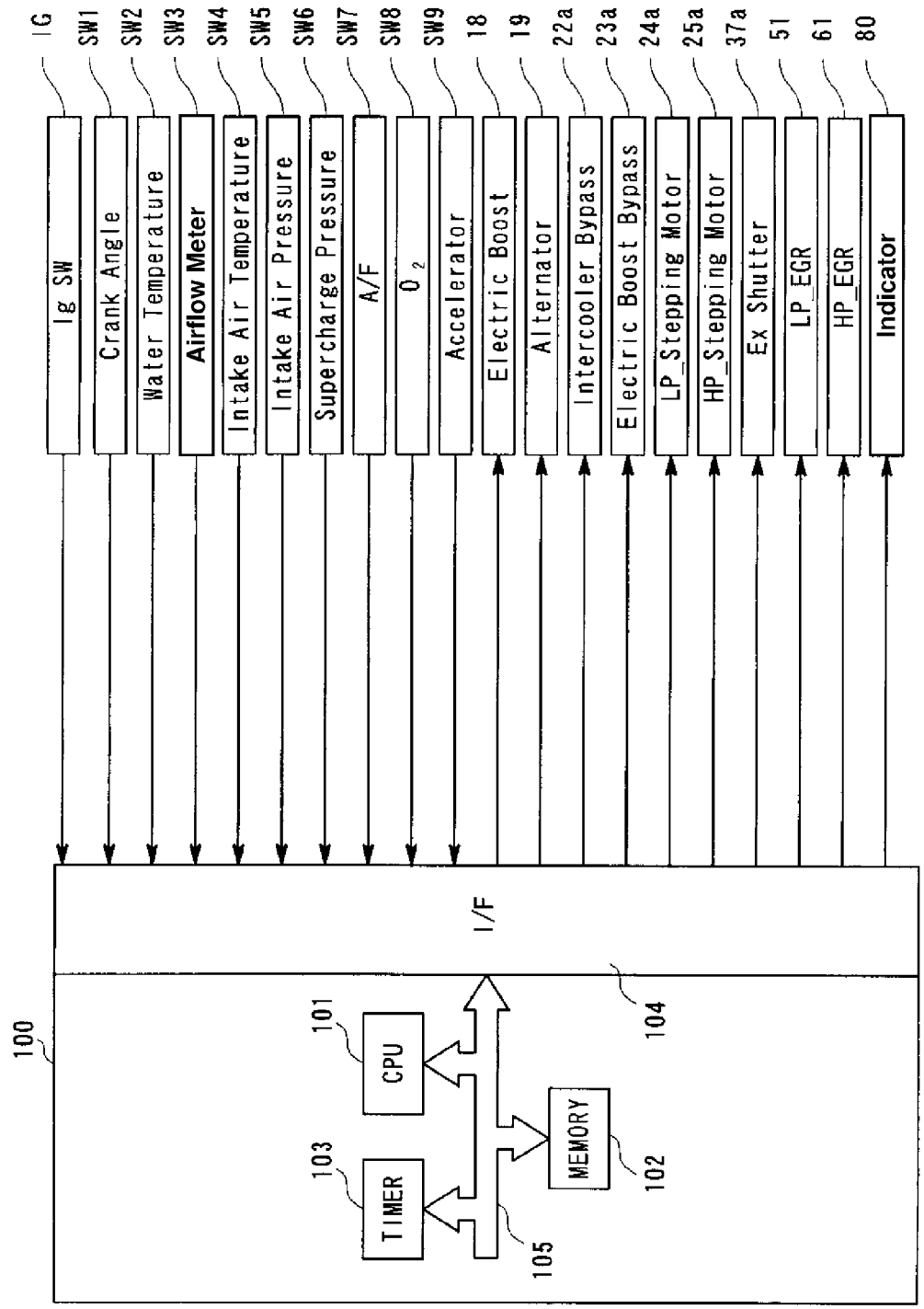
FIG. 2 shows a schematic diagram of an engine controller and its inputs and outputs in accordance with the embodiment.

Referring to FIG. 2, the engine controller 100 is consisted of a microprocessor which comprises a central processing unit (CPU) 101, a memory 102, a counter timer group 103, an interface 104 and a bus 105 that connects these units 101 through 104.

As input elements to the interface 104, various sensors including the above described sensors SW1 through SW9 as well as an ignition switch IG are connected to determine the operating condition of the engine system based on these switch and sensors IG and SW1 through SW9 and others. As output elements to the interface 104, units like other controllers and drivers not illustrated may be connected. It is configured to operate the electric supercharger 18, the actuators 22a and 23a of the control valves 22 and 23, the stepping motors 24a and 25a of the throttle valve 24 and the intake shutter valve 25, the actuator 37a of the exhaust shutter valve 37 through these units.

In the memory 102, programs and data are stored to control the overall engine system. By executing these programs, the engine controller 100 functionally constructs an electric supercharger operating means to operate the electric supercharger 18, an electric supercharger diagnosis means to determine a failure or degradation of the electric supercharger during its operation and a control means to generally control these means.

An indicator 80 is arranged on an instrument panel of the vehicle on which the engine system in accordance with the embodiment is mounted. The indicator 80 shows a diagnosis result of the electric supercharger 18. For example, it may be embodied by a liquid crystal display (LCD) or a light emitting diode (LED) and may indicate a normal state and an abnormal state of the electric supercharger 18. To control the indicator 80, an area to store a supercharger failure flag $F_{FAIL}$ indicating a diagnosis result of the electric supercharger 18 is provided in the memory 102. When the value of the supercharger failure flag $F_{FAIL}$ is 0, the indicator 80 indicates the normal state, or may alternatively in the case of LED indicate nothing. On the other hand, when the value of the supercharger failure flag $F_{FAIL}$ is 1, the indicator 80 indicates the abnormal state of the electric supercharger, for example, by tuning on the LED.

Also to control the operation of the engine system, in the memory 102, a control maps M1 and M2 are stored. The map M1 corresponds to a diagram of FIG. 3, and the map M2 corresponds to a graph of FIG. 4.

Figure 3:
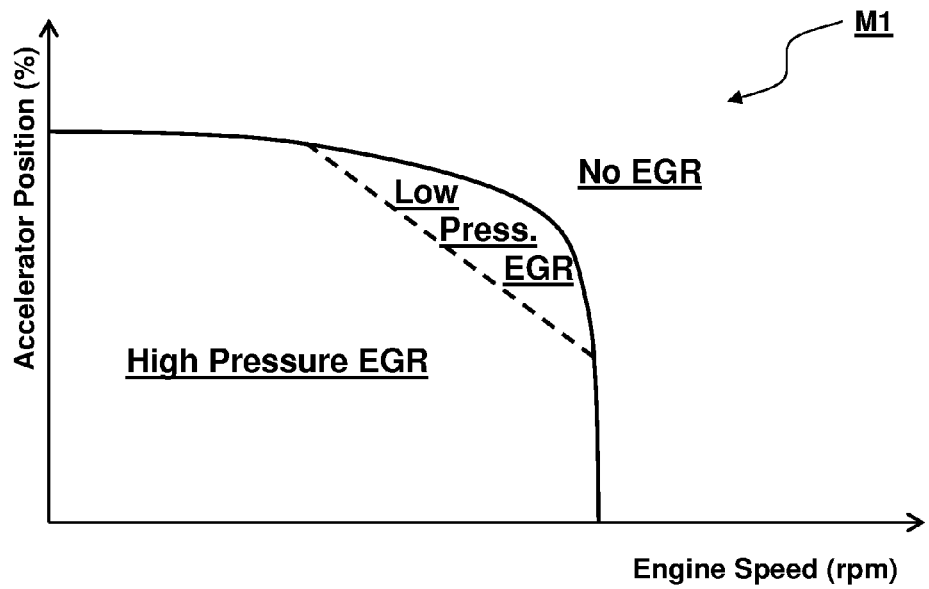
FIG. 3 is a graph showing an operational map of an exhaust gas recirculation (EGR) system.

FIG. 3 shows the EGR control diagram on a coordinate of the accelerator position and the engine speed corresponding to the control map M1. Referring to FIG. 3, a non-EGR region is outside of the solid line or at the higher speed side and/or the higher load side of the engine operating range where EGR is stopped or no exhaust gas is re-circulated. An EGR region is inside of the solid line or in the rest of the operating range or the lower or mid speed and lower or mid load side of the operating range where EGR is demanded or the exhaust gas is re-circulated. In a low pressure region at the higher speed and higher load side of the EGR region, or between the solid line and the broken line, the exhaust gas is re-circulated through the low pressure EGR passage 50 to the intake system 10. On the other hand, in the rest of the EGR region or below the broken line, the exhaust gas is re-circulated through the high pressure EGR passage 60 to the intake system 10.

The operating regions A and B illustrated in FIG. 3 is based on data derived from experiments and the like and stored as the control map M1 in the memory 102 of the engine controller 100 shown in FIG. 2.

Figure 4:
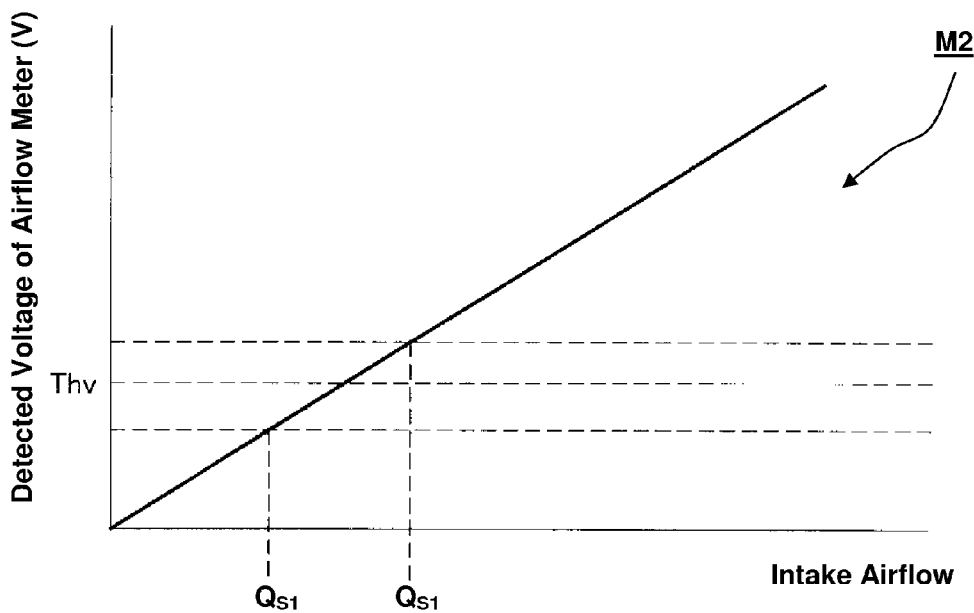
FIG. 4 is a graph showing a relationship between intake airflow and output voltage of an airflow meter.

Referring to FIG. 4, there is shown a graph plotting a relationship between an output voltage of the airflow meter SW3 and an intake airflow amount. Data for transforming the voltage detected by the airflow meter SW3 to the intake airflow amount Q is set based on experiments and the like and stored in the memory 102. Thereby, the intake airflow Q can be determined based on the detected voltage of the airflow meter SW3. In the graph of FIG. 4, a voltage value Thv is a sensitivity limit value corresponding to a minimum airflow amount which the airflow meter SW3 can detect. In the present embodiment, intake airflow amounts $Q_{S1}$ and $Q_{S2}$ are predetermined as lower and upper diagnosis threshold values based on the value Thv.

The relationship between the output voltage of the airflow meter SW3 and the intake airflow amount Q illustrated in FIG. 4 is based on data derived from experiments and the like and stored as the control map M2 in the memory 102 of the engine controller 100 shown in FIG. 2.

Figure 5:
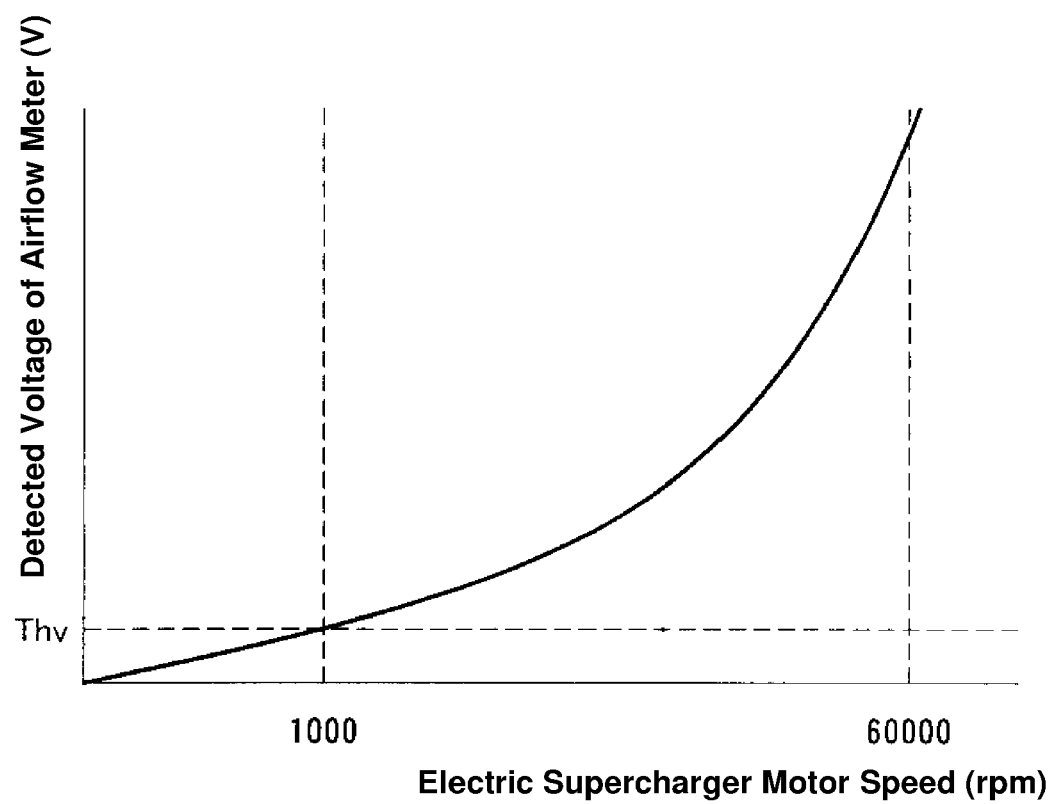
FIG. 5 is a graph showing a speed of an electric supercharger and the output voltage of the airflow meter.

Referring to FIG. 5, there is shown a graph plotting a relationship between the output voltage of the airflow meter SW3 and the rotational speed of the electric supercharger 18. In the illustrated embodiment, the airflow meter SW3 outputs the sensitivity limit value Thv corresponding to the minimum airflow amount which the airflow meter SW3 can detect when the electric supercharger is rotating at 1000 rpm. Therefore, in the present embodiment, when the electric supercharger 18 is operated for its diagnosis, it is operated at as low as 1000 rpm. Thereby, electricity consumption of the battery 20 can be saved, and load acted on the electric supercharger 18 for the diagnosis can be reduced. On the other hand, during the normal operation, the electric supercharger 18 is configured to be able to operate at as high as 60,000 rpm.

Figure 6:
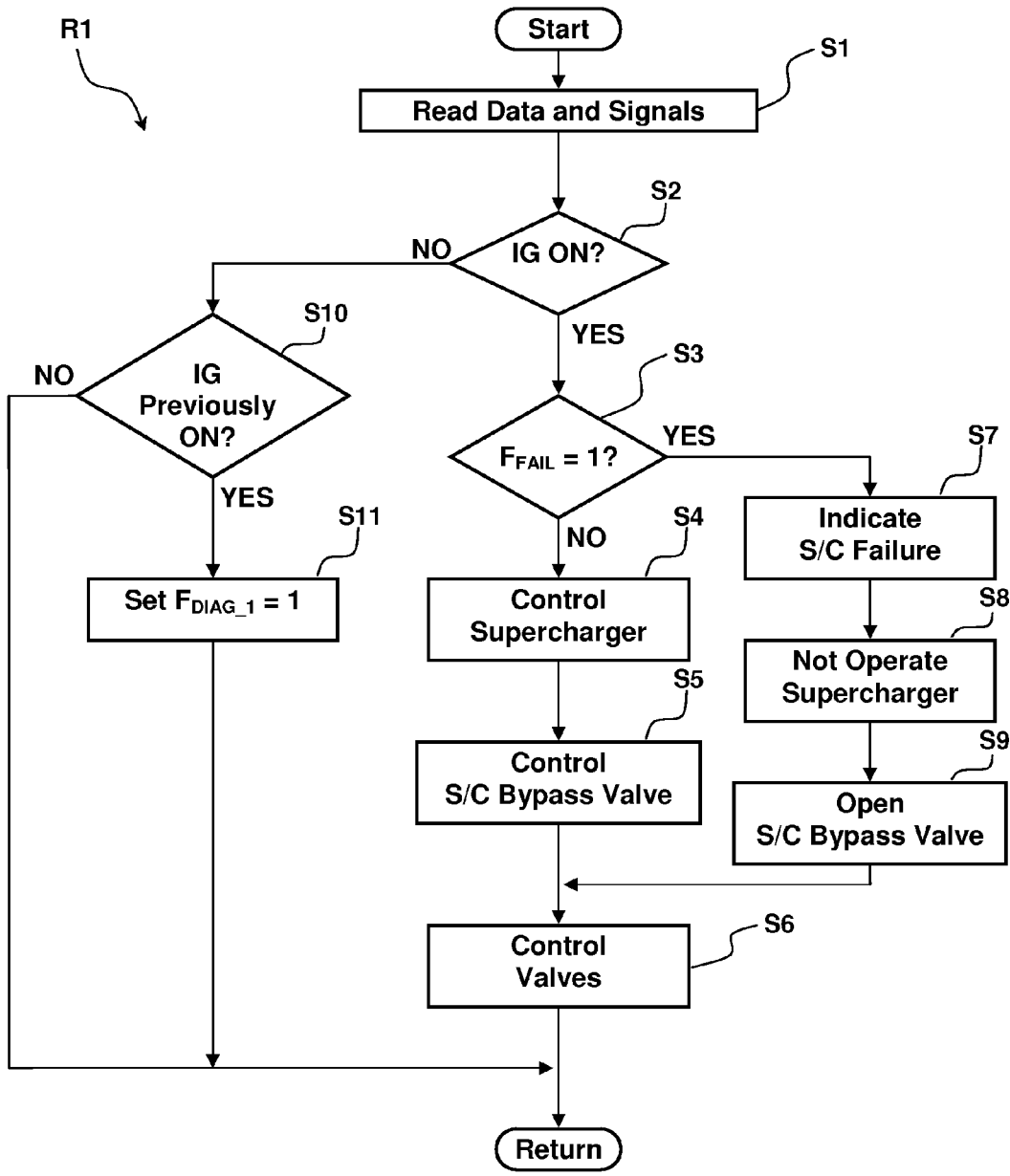
FIG. 6 is a flowchart of a routine executed by an engine controller to control the supercharged engine system in accordance with the embodiment.

Referring to FIG. 6, there is shown a flowchart illustrating a routine R1 executed by the engine controller 100 for controlling part of the engine system including the electric supercharger 18 according to the embodiment. After the start, the routine R1 proceeds to a step S1 and reads data stored in the memory of the engine controller 100 and signals from the various sensors. Then, the routine proceeds to a step S2 and determines whether the engine ignition switch IG is ON or not.

When it is determined the engine ignition switch IG is ON at the step S2 (Yes), the routine R1 proceeds to a step S3 and determines the supercharger fail flag $F_{FAIL}$ is high (=1) or not. The flag $F_{FAIL}$ will be described in greater detail below.

When it is determined that the supercharger fail flag $F_{FAIL}$ is low (=0) at the step S3 (NO), which means that the electric supercharger 18 is determined to be in a normal state or not degraded by a supercharger diagnosis routine R2 described in greater detail below, the routine R1 proceeds to a step S4 and the engine controller 100 controls the electric motor 18a to drive the supercharger 18 in accordance with the operating condition of the engine 1 based on the data and signals read at the step S1. After the step S4, the routine R1 proceeds to a step S5 and the engine controller 100 controls the actuators 23a to operate the supercharger bypass control valve 23 in accordance with the operating condition of the engine 1 based on the data and signals read at the step S1. Further the routine R1 proceeds to a step S6 and the engine controller 100 controls the stepping motors 22a, 24a, 25a and 37a and other actuators to operate the intercooler bypass valve 22, the intake throttle valve 24, the intake shutter valve 25, the exhaust shutter valve, the low pressure EGR control valve 51 and the high pressure EGR control valve 61 in accordance with the engine operating conditions, for example by referring to the map M1. Then, the routine R1 returns.

On the other hand, when it is determined that the supercharger fail flag $F_{FAIL}$ is high (=1) at the step S3 (YES), which means that the electric supercharger is determined to be in a fail state or degraded at the supercharger diagnosis routine R10, the routine R1 proceeds to a step S7 and the engine controller 100 controls the indicator 80 to indicate the fail or degradation of the electric supercharger 18 or its surrounding component by illuminating the LED, for example. After the step S7, the routine R1 proceeds to a step S8 and the engine controller 100 controls the electric motor 18a not to operate the supercharger 18. And, the routine R1 proceeds to a step S9 and the engine controller 100 controls the stepping motor 18a to open the supercharger bypass valve 23. Then, the routine R1 proceeds to the step S6 and then returns.

At the step S2 on the other hand, when it is determined that the engine ignition switch IG is not ON (NO), the routine R1 proceeds to a step S10 and determines whether or not the ignition switch IG was ON in the previous path of this routine. If not, the routine R1 returns.

On the other hand, when it is determined that the ignition switch was ON in the previous path, which means that the ignition switch IG is just turned OFF from ON, the routine R1 proceeds to a step S11 and sets a first diagnosis flag $F_{DIAG\_1}$ to be high (=1). The supercharger diagnosis routine R10 will read the flag $F_{DIAG\_1}$ as described in greater detail below. After the step S11, the routine R1 returns.

Figure 7A:
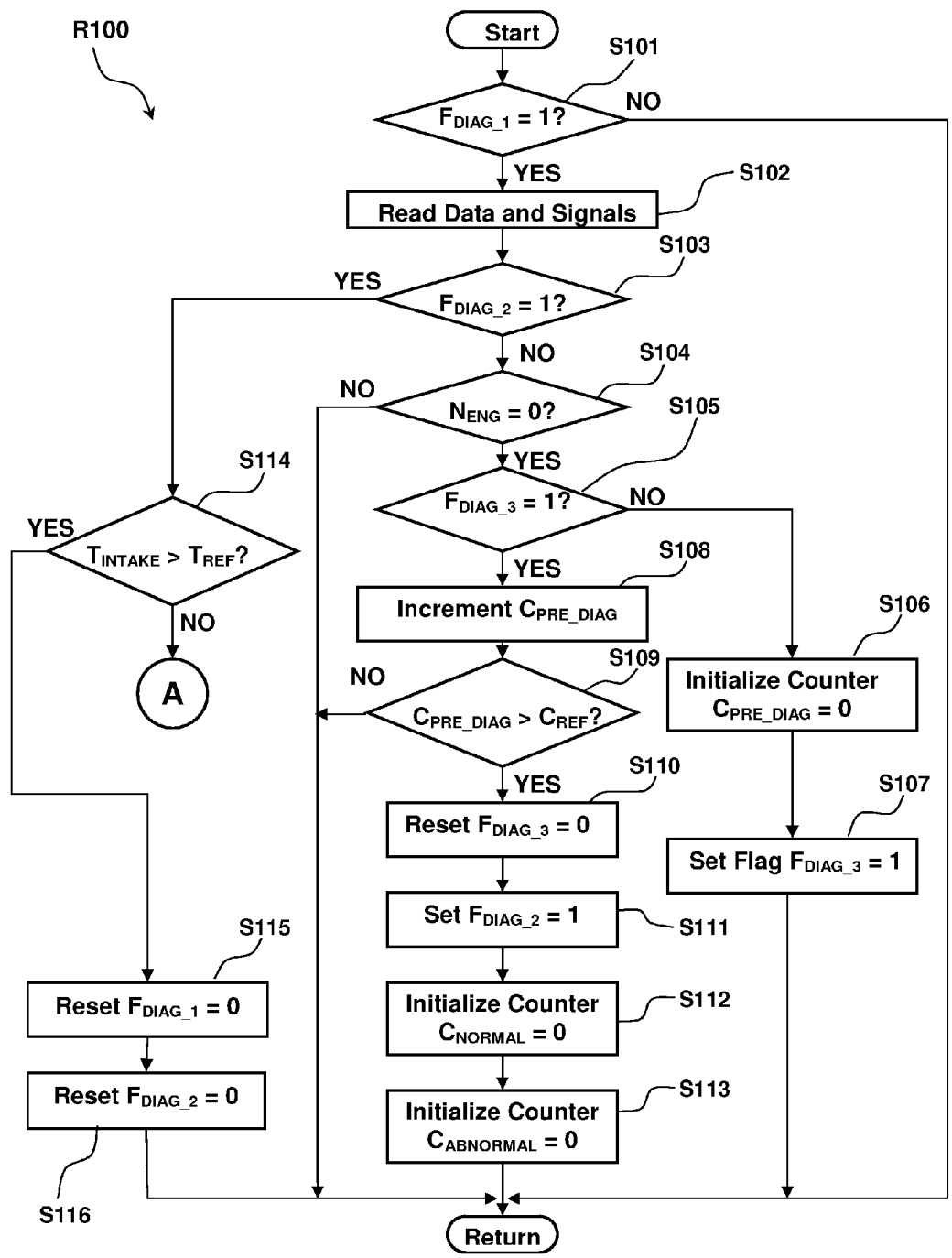
FIG. 7 is a flowchart of a routine executed by the engine controller to determine the state of the supercharger when the engine is stopped in accordance with the embodiment.

There is shown, in FIG. 7, a flowchart of the supercharger diagnosis routine R2. Referring to FIG. 7A, after the start, the routine R10 proceeds to a step S101 and determines whether or not the first diagnosis flag $F_{DIAG\_1}$ is high (=1) or raised at the step S11 of the routine R1. If not, the routine R2 returns and the engine controller 100 does not execute the diagnosis on the electric supercharger 18.

On the other hand, when it is determined that the first diagnosis flag $F_{DIAG\_1}$ is high (=1) at the step the step S101 (NO), which means that the ignition switch is just turned off, the routine R100 proceeds to a step S102 and reads data stored in the memory of the engine controller 100 and signals from the various sensors. Then, the routine R100 proceeds to a step S103 and determines whether or not a second diagnosis flag $F_{DIAG\_2}$ is high (=1) which indicates that a certain amount of time has passed after the engine 1 is completely stopped. If it is determined that the flag $F_{DIAG\_2}$ is not high (=0), the routine R100 proceeds to a step S104 and determines the engine speed $N_{ENG}$ is zero or not.

When it is determined at the step S104 that the engine speed $N_{ENG}$ is not zero, which means that the crank angle sensor SW1 still detects rotational movement of the crankshaft 8, the routine R10 returns so as to suspend the diagnosis of the supercharger 18 until the complete stop of the engine 1. On the other hand, when it is determined at the step S104 that the engine speed $N_{ENG}$ is zero, which means that the engine 1 is supposed to be completely stopped, the routine R2 proceeds to a step S105 and determines whether or not a third diagnosis flag $F_{DIAG\_3}$ is high (=1) which indicates the time period from the engine complete stop is counted.

When it is determined that the third diagnosis flag $F_{DIAG\_3}$ is not high (=0) at the step S105 (NO), the routine R100 proceeds to a step S106 and initializes a pre-diagnosis counter $C_{PRE\_DIAG}$ to be zero (=0). Then, the routine R100 proceeds to a step S107 and raises the third diagnosis flag $F_{DIAG\_3}$ to be high (=1).

When it is determined at the step S105 that the third diagnosis flag $F_{DIAG\_3}$ is high (=1), the routine R100 proceeds to a step S108 and increments the pre-diagnosis counter $C_{PRE\_DIAG}$ by one. Then, it proceeds to a step S109 and determines whether a count value of the pre-diagnosis counter $C_{PRE\_DIAG}$ is greater than a predetermined reference count value $C_{REF}$ or not. When it is determined that the count value of the pre-diagnosis counter $C_{PRE\_DIAG}$ is not greater than the value $C_{REF}$ at the step S109 (NO), the routine R100 returns so as to keep counting up the pre-diagnosis counter $C_{PRE\_DIAG}$.

On the other hand, when it is determined that the count value of the pre-diagnosis counter $C_{PRE\_DIAG}$ is greater than the value $C_{REF}$ at the step S109 (YES), it means that the predetermined time period has passed since the engine 1 was supposed to be completely stopped at the step S104. Then, the routine R100 proceeds to a step S110 and resets the third diagnosis flag $F_{DIAG\_3}$ to be low (=0). Further, the routine R100 proceeds to a step S111 and sets the second diagnosis flag $F_{DIAG\_2}$ to be high (=1) so that in the next path the routine R100 determines YES at the step S103. After the step S111, the routine R100 proceeds to steps S112 and S113 and initializes a normal counter $C_{NORMAL}$ and an abnormal counter $C_{ABNORMAL}$ to be zero. Then, the routine R100 returns.

When it is determined at the step S103 that the second diagnosis flag $F_{DIAG\_2}$ is high (=1), which means that the certain period time has passed since the engine 1 is completely stopped, the routine R100 proceeds to a step S114 and determines whether or not an intake air temperature $T_{INTAKE}$ which the intake air temperature sensor SW4 detects is higher than a predetermined reference temperature $T_{REF}$. The reference intake air temperature $T_{REF}$ corresponds to a temperature of the supercharger 18 below which there is no possibility of heat damage on the supercharger 18 or its motor 18a. If it is determined that the intake air temperature $T_{INTAKE}$ is greater than the reference temperature $T_{REF}$ at the step S114 (YES), the routine proceeds to steps S115 and S116 and resets the first diagnosis flag $F_{DIAG\_1}$ and the second diagnosis flag $F_{DIAG\_2}$ so that the diagnosis on the supercharger 18 is not made at least until the ignition switch IG is turned OFF from ON as determined at the step 10 of the routine R1.

When it is determined that the intake air temperature $T_{INTAKE}$ is not greater than the reference temperature $T_{REF}$ at the step S114 (NO), which means that there is no possibility of heat damage on the supercharger 18 or its motor 18a, the routine proceeds to a step S117.

Figure 7B:
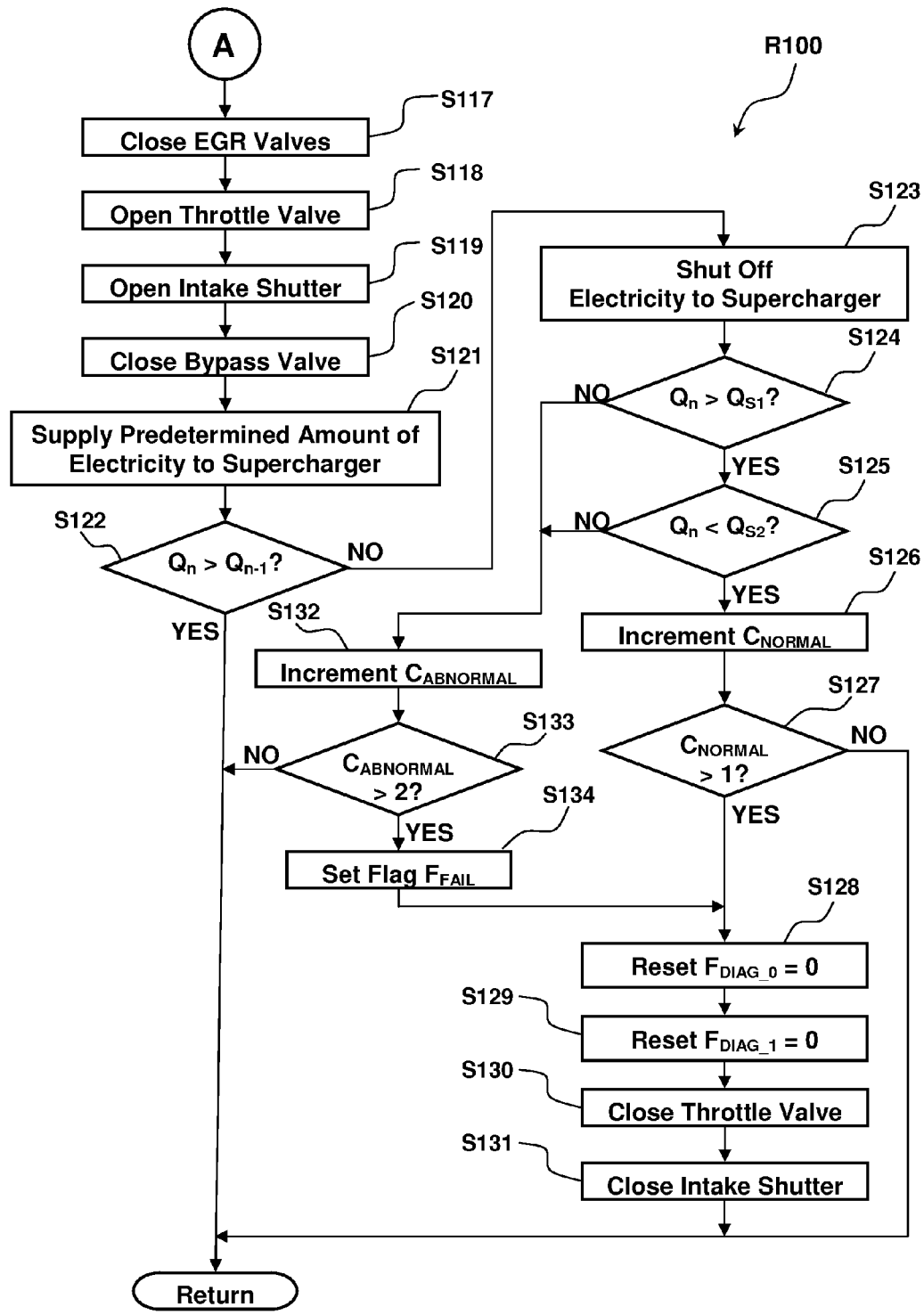

Referring to FIG. 7B, at the step S117, the engine controller 100 controls the actuators to close the EGR control valves 51 and 61. Then, the routine R100 proceeds to a step S118 and the engine controller 100 controls the stepping motor 24a to open the throttle valve 24. And, the routine R100 proceeds to a step S119 and the engine controller 100 controls the stepping motor 25a to open the intake shutter valve 25. Further, the routine R100 proceeds to a step S120 and controls the actuator 23a to close the supercharger bypass valve 23. Finally, the routine R100 proceeds to a step S121 and controls the electric power supply system including the alternator 19 and the battery 20 to supply a predetermined amount of electricity to the electric motor 18a of the supercharger 18. The amount of electricity may be a product of the current flowing through and the voltage applied on the electric motor 18a. The electricity may be predefined by experiments so that the supercharger 18 rotates at 1000 rpm with it in the predefined condition of the intake system 10 as set at the steps S117 through S120.

After the step S121, the routine R100 proceeds to a step S122 and determines whether or not a current amount of airflow $Q_n$ detected by the airflow meter SW3 is greater than a previous amount of airflow $Q_{n-1}$ detected in the previous path of the routine R100. When it is determined that the current airflow $Q_n$ is greater than the previous airflow $Q_{n-1}$ at the step S122 (YES), which means that the airflow Q is increasing, the routine R100 returns and repeats the steps. When it is determined that the current airflow $Q_n$ is not greater than the previous airflow $Q_{n-1}$ (NO) at the step S122, which means that the airflow Q has reached the peak amount, the current airflow amount $Q_n$ is used for the diagnosis of the supercharger 18 and the supercharger 18 is no more needed to operate.

Then, the routine R100 proceeds to the step S123 and the engine controller 100 controls the electric power supply system to shut off the electricity supplied to the electric motor 18a of the supercharger 18.

After the step S123, the routine R100 proceeds to a step S124 and determines whether or not the current airflow amount $Q_n$ is greater than the lower diagnosis threshold $Q_{S1}$ described above. When it is determined that the current airflow amount $Q_n$ is greater than the lower diagnosis threshold $Q_{S1}$ at the step S124 (YES), the routine R100 proceeds to a step S125 and determines whether or not the current airflow amount $Q_n$ is less than the upper diagnosis threshold $Q_{S2}$ described above. When it is determined YES at the step S125, it means that the current airflow amount $Q_n$ is between the lower and upper threshold values $Q_{S1}$ and $Q_{S2}$ and that there is no possibility of failure or degradation of the supercharger 18, the electric motor 18a or the surrounding components such as the power supply system described above. Then, the routine R100 proceeds to a step S126 and increments the normal counter $C_{NORMAL}$, which has been initialized at the step S112, by one.

After the step S126, the routine R100 proceeds to a step S127 and determines whether or not the count value $C_{NORMAL}$ is greater than 1 (one). If it is NO at the step S127, the count value is 1, and the routine R100 returns and repeats the steps for the diagnosis of the supercharger 17 and the surrounding components.

On the other hand, when it is determined that the count value $C_{NORMAL}$ is greater than one, which means that the peak values of the airflow Q have been twice within the range between $Q_{S1}$ and $Q_{S2}$, it is confirmed that there is no possibility of failure or degradation of the supercharger 17 and the surrounding components. Then, the routine R100 proceeds to a step S128 and resets the first diagnosis flag $F_{DIAG\_1}$ to be low so that the steps after the step S101 for the supercharger diagnosis is not executed at the next path. After the step S128, the routine R100 proceeds to a step S129 and resets the second diagnosis flag $F_{DIAG\_2}$ to be low. Further, the routine R10 proceeds to steps S130 and S131 and controls the stepping motors 24a and 25a to close the throttle valve 24 and the intake shutter valve 25, which were opened at the steps S118 and S119, to establish a regular engine stop state of the intake system 10.

When it is determined that the current airflow amount $Q_n$ is not greater than the lower threshold value $Q_{S1}$ at the step S124 (NO) or not less than the upper threshold value $Q_{S2}$ at the step S125 (NO), which means the current airflow amount $Q_n$ is out of the range between $Q_{S1}$ and $Q_{S2}$, the routine R100 proceeds to a step S132 and increments the abnormal counter $C_{ABNORMAL}$, which has been initialized at the step S113, by one.

After the step S132, the routine R100 proceeds to a step S133 and determines whether or not the count value $C_{ABNORMAL}$ is greater than 2 (two). If it is NO at the step S133, the count value is one or two, and the routine R100 returns and repeats the steps for the diagnosis of the supercharger 17 and the surrounding components.

On the other hand, when it is determined that the count value $C_{ABORMAL}$ is greater than two at the step S133 (YES), which means that the peak values of the airflow Q have been out of the range between $Q_{S1}$ and $Q_{S2}$ three times, it is confirmed that there is a possibility of failure or degradation of the supercharger 17 and the surrounding components. Then, the routine R100 proceeds to a step S134 and sets the supercharger fail flag $F_{FAIL}$ to be high (=1), which is read at the step S3 of the routine R1. After the step S134, the routine R100 goes through the steps S128 through S131 and completes the diagnosis of the supercharger 17 and the surrounding components.

Figure 8:
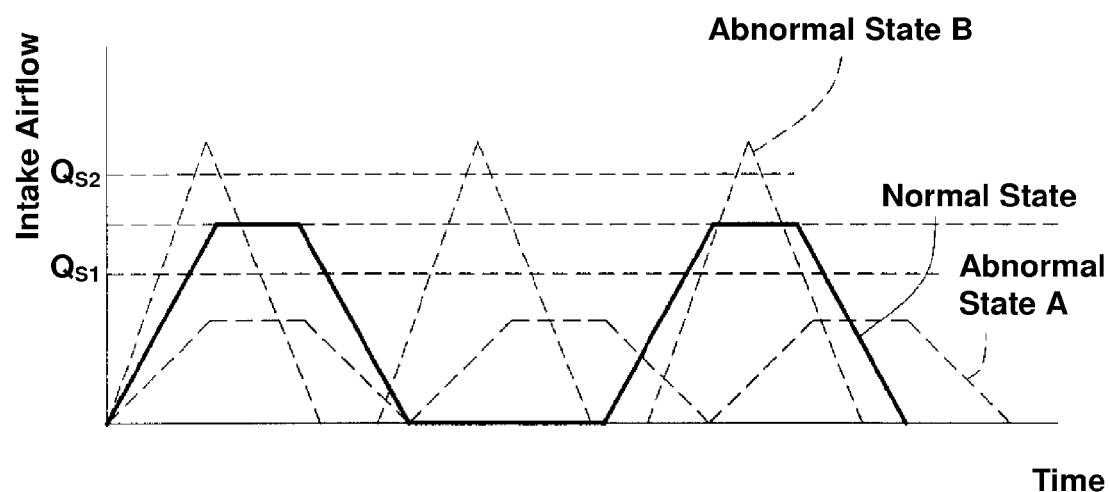
FIG. 8 is a time chart showing changes of the intake airflow detected when the supercharger is in a normal state and when it is in abnormal states.

Referring to FIG. 8, there is shown changes of intake airflow amount Q when the supercharger diagnosis routine R100 illustrated in FIG. 7 is executed. When the ignition switch IG is turned OFF as determined at the step S10 of the routine R1 illustrated in FIG. 6, the supercharger diagnosis routine R100 goes through the step S102 and the following.

Before determining the state of the supercharger 18 and the surrounding components, the intake system 10 is set in the predetermined condition by closing the EGR control valves 51 and 61 at the step S117, opening the throttle valve 24, opening the intake shutter valve 25 and opening the bypass valves 22 and 23. Further, the electric motor 18a is supplied the predetermined amount of electricity at the step S121. Therefore, the state of the supercharger can be determined always under the same condition. Upon starting the electricity supply, the supercharger 18 increases its speed and the airflow Q increases accordingly while the amount of the supplied electricity is constant.

If the supercharger 18 and the surrounding component have no failure or degradation, the airflow Q is converging within the range between the lower and upper threshold values $Q_{S1}$ and $Q_{S2}$ as indicated by a solid line labeled "Normal State" of FIG. 8. Then, the peak value $Q_n$ is identified at the step S122 of the routine R100 and the electricity supplied to the supercharger motor 18a is shut off at the step S123. Accordingly, the airflow Q decreases as indicated by the solid line of FIG. 8. The peak value is determined within the range between $Q_{S1}$ and $Q_{S2}$ at the steps S124 and S123, and the count value $C_{NORMAL}$ is incremented at the step S126. This process repeats until the count value $C_{NORMAL}$ exceeds one as determined at the step S127, in other words, twice as shown by the solid line of FIG. 8.

If the supercharger 18 or the surrounding component has a failure or degradation, in most of the cases, even with the same amount of the electricity supplied to the electric motor 18a of the supercharger 18, the airflow Q is saturated at a level below the lower threshold value $Q_{S1}$, as shown by a broken line labeled "Abnormal State A" of FIG. 8. The same way as with no failure or degradation, the peak value $Q_n$ is identified at the step S122 and the electricity supplied to the electric motor 17a is shutoff at the step S123. The peak value $Q_n$ is determined below the lower threshold $Q_{S2}$ at the step S124, and the abnormal count value $C_{ABNORMAL}$ is incremented at the step S128. This process repeats until the count value $C_{ABORMAL}$ exceeds two as determined at the step S130, in other words, three times, as shown by the broken line A of FIG. 8.

If the electric power supply system to the electric motor 18a of the supercharger 18 has a failure or degradation, the airflow Q might exceed the upper threshold value $Q_{S2}$. In that case, a safe circuit integrated into the electric power supply system shuts off the electricity when the amount of electricity exceeds its own limit value as shown by a broken line labeled "Abnormal State B" of FIG. 8. The limit value of the electricity corresponds to an amount of airflow Q much greater than the upper threshold value $Q_{S2}$. In the case of "Abnormal State B", upon the shutoff of the electricity, the peak value $Q_n$ is identified at the step S122. Then, the same process is repeated three times as in the case of "Abnormal State A".

In the above embodiment, the electric supercharger 18 is diagnosed when the engine 1 is stopped and it is possible to diagnose the electric supercharger 18 under more stable condition which may be varied by the engine operation.

Further in the above embodiment, the intake air temperature sensor SW4 detects a parameter related to a temperature of intake air supplied to the intake system 10 and outputs it to the engine controller 100. When the engine controller 100 determines that the intake air temperature $T_{INTAKE}$ is equal to or greater than the predetermined threshold $T_{REF}$ at the step S114 of the routine R100 shown in FIG. 7, the diagnosis of the electric supercharger 18 is not performed. Therefore, the electric supercharger 18 is not operated under the condition of intake air temperature above the predetermined threshold so as to protect the motor 18a of the electric supercharger 18 from the heat damage. For instance, where the engine compartment is hot after the engine is operated long time, the electric supercharger 18 is not operated and there will be no risk of damage on the motor 18a of the electric supercharger 18.

In the above embodiment, the electric supercharger 18 is diagnosed based on the signal from the airflow meter SW3 arranged in the intake system 10, and then the electric supercharger 18 is operated in the lower speed range having the lower limit of the rotational speed of the electric supercharger 18 corresponding to the sensitivity limit Thv of the airflow meter SW3 (in this embodiment, the speed is 1000 rpm). Therefore, in operating the electric supercharger 18, the speed is as low as possible so that the electric consumption for the electric motor 18a and the load on the electric supercharger 18 can be reduced.

It is needless to say that the above embodiment is merely an example and the invention is not limited to the above embodiment.

For example, the motor 18a of the supercharger 18 is not limited to the electric motor which takes electricity as its driving power. Alternatively, it may be a hydraulic motor or any type of motor which can be supplied its driving power when the engine is stopped.

In the above embodiment, only the intake air temperature sensor SW4 is used to determine the heat on the electric supercharger 18. Instead, the engine temperature sensor SW2 can be used, or both the sensors can be used.

Instead of solely using the output value of the airflow meter SW3, the output value of the boost pressure sensor SW6 can be used as a parameter of the state of the supercharger 17 and the surrounding components for the diagnosis, or both the sensors can be used.

Further, current and voltage of the electricity supplied to the electric supercharger 18 may be detected, and based on these the rotational speed may be controlled.

To select between the low pressure EGR passage 50 and the high pressure EGR passage 60, in stead of or in addition to being based on the engine speed and the accelerator position as shown in FIG. 3, it may be based on an engine temperature, an exhaust gas temperature or a temperature of the exhaust gas purification system.

In addition to the above, alternative designs are possible without departing from the scope of the attached claims.

The invention claimed is:

1. A method of controlling an engine system having an internal combustion engine, a supercharger arranged in an intake air passage of said internal combustion engine and a motor capable of driving said supercharger, the method comprising:
   driving said motor to operate said supercharger to boost airflow inducted into said internal combustion engine when said internal combustion engine is in operation;
   sensing at least one of an intake air temperature via an intake temperature sensor disposed in an intake air passage through which air is inducted into said internal combustion engine and an engine temperature via an engine temperature sensor coupled to the internal combustion engine;
   determining that a temperature parameter related to a temperature of said supercharger is below a predetermined value based on the at least one of the intake air temperature and the engine temperature;
   driving said motor to detect a state of said supercharger when said internal combustion engine is stopped when the temperature parameter related to a temperature of said supercharger is below a predetermined value; and
   indicating the detected state of said supercharger.

2. The method as described in claim 1, wherein said temperature parameter is a temperature of air in said intake air passage.

3. The method as described in claim 1, further comprising detecting an airflow parameter related to airflow in said intake air passage to detect the state of said supercharger.

4. The method as described in claim 3, wherein said airflow parameter is amount of flow of the airflow in said intake air passage.

5. The method as described in claim 4, wherein the amount of flow is detected upstream of said supercharger.

6. The method as described in claim 3, wherein said airflow parameter is a pressure in said intake air passage.

7. The method as described in claim 6, wherein said pressure is detected downstream of said supercharger.

8. The method as described in claim 3, further comprising establishing a predetermined state of said intake air passage prior to detecting said airflow parameter.

9. The method as described in claim 3, further comprising supplying a predetermined amount of power to said motor when said internal combustion engine is stopped.

10. The method as described in claim 9, wherein said predetermined amount of power continues to be supplied to said motor at least until said airflow parameter reaches a peak value.

11. A method of controlling an engine system having an internal combustion engine, a supercharger arranged in an intake air passage of said internal combustion engine and a motor capable of driving said supercharger, the method comprising:
   driving said motor to operate said supercharger to boost airflow inducted into said internal combustion engine when said internal combustion engine is in operation;
   sensing at least one of an intake air temperature via an intake temperature sensor disposed in an intake air passage through which air is inducted into said internal combustion engine and an engine temperature via an engine temperature sensor coupled to the internal combustion engine;
   determining that a temperature parameter related to a temperature of said supercharger is below a predetermined value based on the at least one of the intake air temperature and the engine temperature;
   supplying a predetermined amount of power to said motor to drive said motor to detect a state of said supercharger when said internal combustion engine is stopped and when the temperature parameter is below the predetermined value;
   detecting an airflow parameter related to airflow in said intake air passage to detect the state of said supercharger; and
   indicating the detected state of said supercharger, and wherein the method further comprises:
      maintaining said predetermined amount of the power substantially constant; and
      shutting off the power upon determining that said airflow parameter reaches a peak value to thereby reduce electricity consumption of the supercharger.

12. The method as described in claim 11, further comprising determining a peak value of said airflow parameter to detect the state of said supercharger.

13. The method as described in claim 1, wherein said motor is driven to detect the state of said supercharger after a rotational velocity of said internal combustion engine is below a predetermined velocity.

14. The method as described in claim 1, wherein said motor is driven to detect the state of said supercharger when a rotational velocity of said internal combustion engine is below a predetermined velocity.

15. The method as described in claim 1, wherein the detected state of said supercharger is indicated to an operator of said internal combustion engine.

16. A system comprising:
   an internal combustion engine;
   an intake air passage through which air is inducted into said internal combustion engine;
   an intake temperature sensor coupled to said intake air passage;
   an engine temperature sensor coupled to the internal combustion engine;

a supercharger arranged in said intake air passage and capable of boosting airflow to said internal combustion engine;

a motor capable of driving said supercharger; and a controller configured to determine that a temperature parameter related to a temperature of said supercharger is below a predetermined value based on a signal from at least one of the intake and engine temperature sensors and to control said motor to drive said supercharger when said internal combustion engine is stopped and when the temperature parameter related to a temperature of said supercharger is below a predetermined value and to detect a state of said supercharger.

17. The system as described in claim 16, further comprising an indicator noticeable to an operator of said internal combustion engine, and wherein said controller is further configured to control an indicator to notify the detected state of said supercharger to an operator.

18. The system as described in claim 16, further comprising an air control valve configured to vary a state of said intake air passage, and wherein said controller is further configured to control said air control valve at a predetermined state when said motor is driven to detect the state of said supercharger.

19. The system as described in claim 16, further comprising:

a bypass passage arranged in said intake air passage and bypassing said supercharger; and a bypass control valve capable of closing said bypass passage, and wherein said controller is further configured to control said bypass control valve to close said bypass passage when said motor is driven to detect the state of said supercharger.

* * * * *